United States Patent
Shinojima (10) Patent No.: US 7,349,620 B2
(45) Date of Patent: Mar. 25, 2008

(54) ELECTRO-OPTICAL DEVICE AND ELECTRONIC INSTRUMENT

(75) Inventor: Kazumoto Shinojima, Shiojiri (JP)

(73) Assignee: Seiko Epson Corporation (JP)

( * ) Notice: Subject to any disclaimer, the term of this patent is extended or adjusted under 35 U.S.C. 154(b) by 58 days.

(21) Appl. No.: 10/666,911

(22) Filed: Sep. 19, 2003

(65) Prior Publication Data

US 2004/0109665 A1     Jun. 10, 2004

(30) Foreign Application Priority Data

Sep. 20, 2002   (JP)   ............... 2002-275194

(51) Int. Cl.
  *G02B 6/10*   (2006.01)
  *G02F 1/1333*   (2006.01)

(52) U.S. Cl. .............. 385/901; 385/129; 349/58; 349/65; 349/67

(58) Field of Classification Search ........... 385/129, 385/901
  See application file for complete search history.

(56) References Cited

U.S. PATENT DOCUMENTS 6,147,724 A * 11/2000 Yoshii et al. ............ 349/62
6,692,263 B2 * 2/2004 Villain et al. ............ 439/66
2003/0063456 A1 * 4/2003 Katahira ............... 362/27

FOREIGN PATENT DOCUMENTS

| JP | 1-89487 | 6/1989 |
|---|---|---|
| JP | 06-003688 | 1/1994 |
| JP | 8-504056 | 4/1996 |
| JP | 10-252377 | 9/1998 |
| JP | 10-261858 | 9/1998 |
| JP | 11-109398 | 4/1999 |
| JP | 2000-347211 | 12/2000 |
| JP | 2000-347212 | 12/2000 |
| WO | WO 95/10170 | 4/1995 |

* cited by examiner

*Primary Examiner*—Frank G. Font
*Assistant Examiner*—Erin D Chiem
(74) *Attorney, Agent, or Firm*—Harness, Dickey & Pierce, P.L.C.

(57) ABSTRACT

A wiring circuit board is supported on the back surface of a light-guide plate and the wiring circuit board is inclined in a predetermined direction relative to the panel surface of a liquid crystal panel or to an arrangement position of a holding case. As a result, a substrate terminal is also arranged at an inclined position in the predetermined direction. A connector is mounted on a circuit board. Connector terminals of the connector are elastically deformable at least in a direction contacting the substrate terminal. These connector terminals are conductively connected to a plurality of mounting terminals, which are exposed and extended on the surface of the circuit board, respectively.

7 Claims, 7 Drawing Sheets

ELECTRO-OPTICAL DEVICE AND ELECTRONIC INSTRUMENT

BACKGROUND OF THE INVENTION

1. Technical Field of the Invention

The present invention relates to an electro-optic device and an electronic instrument, and more specifically, it relates to a structure mounted on a circuit board disposed in the electronic instrument and suitable for the electro-optic device.

2. Description of the Related Art

In general, comparative small-sized liquid crystal display modules are used for the display of portable electronic instruments such as mobile phones and various electronic instruments. Such a liquid crystal module is generally mounted on a circuit board disposed within the instrument in a conductive contact state. The liquid crystal module includes a liquid crystal panel, a backlight disposed in the rear of the liquid crystal panel and including a light-guide plate, a flexible wiring substrate conductively connected to the liquid crystal panel, and a holding case (holding-frame member) for holding the liquid crystal panel, the backlight, and the flexible wiring substrate.

There is a structure for mounting the above-mentioned liquid crystal module on the circuit board, in which exposed conductive pad-like substrate terminals (contact terminals) are formed on the flexible wiring substrate in the liquid crystal module, and the holding case is fixed on the circuit board so that the substrate terminals are directly brought into conductive contact with elastic terminals of a connector mounted on the circuit board, respectively. In this case, the holding case is held with a holding frame abutting thereon from an observing side of the liquid crystal panel, and the holding frame is fixed onto the circuit board. The holding case may also be directly fixed onto the circuit board by engaging a hook.

In the conventional mounting structure of the liquid crystal module described above, a contact pressure between the substrate terminals of the liquid crystal module and connector terminals on the circuit board must be appropriately established. If the contact pressure is excessively small, for example, the conductive contact state between the liquid crystal module and the circuit board is deteriorated so that the liquid crystal module operation may become unstable or the display quality is degraded by the contact resistance. Also, if the contact pressure is excessively large, the pressure may be applied to the liquid crystal panel via the light-guide plate of the liquid crystal module, thereby producing display unevenness due to the nonuniformity of the liquid crystal panel gap (thickness of liquid crystal).

However, in the conventional mounting structure of the liquid crystal module described above, because of allowable errors in the holding case of the liquid crystal module, the holding frame or the holding structure for fixing the holding case, and the connector of the circuit board, the contact pressure cannot be precisely estimated in advance, so that sizes are adjusted so as to obtain the appropriate contact pressure by correcting a metal mold for the holding case after assembling parts once manufactured. Therefore, there are problems that the design and development cycle required for supplying the liquid crystal module to a market is increased while initial costs necessary for initiating mass production are increased.

The present invention has been made to solve the problems described above, and it is an object thereof to provide an electro-optic device and an electronic instrument having the electro-optic device capable of completing the development design without correcting part shapes so as to be promptly supplied to market.

Also, it is another object thereof to provide an electro-optic device and an electronic instrument having the electro-optic device capable of reducing initial costs as a consequence of the design and development compared to the conventional case.

SUMMARY

In order to solve the problems described above, an electro-optical device according to the present invention comprises an electro-optical panel having an electro-optical material; a conductive terminal arranged on one side of the electro-optical panel; and a holding member for holding the electro-optical panel, wherein the terminal is disposed on a surface inclined in a predetermined direction relative to an arrangement position of the holding member.

According to the present invention, the terminal is disposed on the surface inclined in the predetermined direction relative to the arrangement position of the holding member, so that the contact pressure between the terminal and an object to be mounted can be adjusted only by shifting a conductive contact position between the terminal and the object in a predetermined direction, without changing the space between the electro-optical device and the object. Therefore, the contact pressure is adjustable without correcting shapes of components, enabling the design and development cycle and initial development costs to be reduced.

For example, in the electro-optical device, by shifting the conductive contact position between the terminal and the object in the predetermined direction, the height of the conductive contact point on the inclined surface is changed. Also, by shifting the forming position of the terminal on the surface of the electro-optical device in a predetermined direction, the height of the terminal itself can be changed.

In the structure in which the terminal is arranged on a surface inclined in a predetermined direction as described above, in the case where the terminal is formed like a conductive pad shape, the conductive contact surface of the terminal itself is inclined in the predetermined direction. Therefore, shifting the conductive contact position in the predetermined direction changes the height of the conductive contact point. Also, in the case of a connector terminal where a terminal is formed in a connector, shifting the connector position on the inclined surface in the predetermined direction changes the height of the connector terminal.

According to the present invention, the electro-optical device may preferably comprise a fixing structure for fixing the holding member on a mounting surface of an object at the arrangement position. By this fixing structure, the electro-optical device is fixed on a circuit board. According to the present invention, since the height of the conductive contact point of the terminal can be changed without changing the mounting position of the electro-optical device as described above, the correction of the fixing structure is not required for changing the contact pressure between the terminal and the object. In this case, instead of the holding member (holding case), a fixing frame member, which will be described later, may also be provided for the fixing structure.

According to the present invention, in an electro-optical device comprising an electro-optical panel having an electro-optical material and a conductive terminal arranged on the backside of the electro-optical panel, it is preferable that the terminal be disposed on a surface inclined in a predetermined direction relative to the panel surface of the electro-optical panel.

According to the present invention, the terminal is disposed on the surface inclined in the predetermined direction relative to the panel surface, so that the contact pressure between the terminal and the object arranged substantially in parallel with the panel surface can be changed without moving the electro-optical device in the instrument. For example, by shifting the conductive contact position between the terminal and the object in the predetermined direction, the height of the object at the conductive contact point can be changed.

Also, by shifting the terminal position in the predetermined direction, the height of the terminal itself on the object can be changed.

In the structure in which the terminal is arranged on a surface inclined in the predetermined direction as described above, and in the case where the terminal is formed like a conductive pad shape, for example, the conductive contact surface of the terminal itself is inclined in the predetermined direction. Therefore, shifting the conductive contact position in the predetermined direction changes the height of the conductive contact point. Also, in the case of the connector terminal where a terminal is formed in a connector, shifting the connector position on the inclined surface in the predetermined direction can change the height of the connector terminal.

According to the present invention, preferably, the terminal has a shape extending in the predetermined direction. Because of the shape of the terminal extending in the predetermined direction, even if a plurality of the terminals are necessary to be juxtaposed in particular, the adjustable range of the conductive contact position can be increased. That is, by shifting the conductive contact position in the predetermined direction or by moving the terminals themselves in the predetermined direction, the conductive contact state to the object can be secured.

For example, in the case where the terminal is formed like a conductive pad shape, when the conductive contact position of the object is shifted in the predetermined direction, because of the shape of the terminal extending in the predetermined direction, even if a plurality of the terminals are necessary to be juxtaposed in particular, the adjustable range of the conductive contact position can be increased. Also, in the case of the connector terminal where the terminal is formed in the connector, the range for securing the conductive contact between the connector terminal and the object can be increased when the connector is shifted.

According to the present invention, preferably, the electro-optical device comprises a wiring circuit board arranged to incline in the predetermined direction, and the terminal is disposed on the wiring circuit board. In the case that the terminal is disposed on the wiring circuit board arranged to incline in the predetermined direction in such a manner, preferably, the connector is further mounted on the wiring circuit board and the connector has the connector terminal equivalent to the terminal. At this time, preferably, a terminal is formed on the wiring circuit board, and the connector is mounted on the terminal. In this case, the terminal may preferably have a shape extending in the predetermined direction. Thereby, the mounting position of the connector on the wiring circuit board can be easily changed in the predetermined direction.

According to the present invention, preferably, the electro-optical device comprises a support unit having a surface inclined in the predetermined direction, and the wiring circuit board is supported on the surface. The wiring circuit board is supported by the support unit, so that the deflection of the wiring circuit board due to the contact pressure between the terminal and the object is restricted, enabling the contact pressure to be established more securely and precisely.

According to the present invention, preferably, the support unit is at least part of illuminating means for illuminating the electro-optical panel. In such a manner, at least part of the illuminating means is used for the support unit, so that an additional support unit is not required only for supporting the wiring circuit board, enabling the electro-optical device to be reduced in size and thickness.

According to the present invention, preferably, the illuminating means comprises a light-guide plate equivalent to (e.g. serving as) the support unit and a light source for introducing light inside the light-guide plate from an edge of the light-guide plate, and the thickness of the light-guide plate gradually decreases (e.g. tapers) in the predetermined direction while the light source is arranged to oppose an edge of the light-guide plate disposed in a direction opposite to the predetermined direction. By using the light-guide plate gradually decreasing in thickness in the direction as the support unit, the wiring circuit board can be arranged at an inclined position corresponding to changes of the light-guide plate in thickness, enabling the electro-optical device to be constructed simply and compactly.

According to the present invention, the terminal may be made of a conductor (a conductive pad, for example), which is not substantially deformed in a contacting direction to an object. In this case, the terminal may preferably be brought into conductive contact with an elastically deformable opposing terminal of the object for obtaining an appropriate contact pressure. Also, the terminal may be made of a conductor, which is not substantially deformed in a contacting direction to an object (a connector terminal, for example). In this case, the appropriate contact pressure can also be obtained if the terminal is brought into conductive contact with the opposing terminal made of the conductor, which is not substantially deformed on the object.

Next, an electronic instrument according to the present invention comprises any one of the electro-optical devices described above; an object mounting the electro-optical device and having an opposing terminal, which is brought into conductive contact with the terminal; and controlling means for controlling the electro-optical device.

According to the present invention, preferably, the object comprises a connector mounted thereon and having an opposing terminal. As the object, there may be, for example, a wiring circuit board and a chassis (a mounting plate).

In this case, the object is provided with a terminal conductively contacting the connector, and the terminal may preferably have a shape extending in the predetermined direction. Thereby, when the mounting position of the connector is adjusted in the predetermined direction, the mounting position of the connector can be easily established over a wide range.

Also, preferably, the opposing terminal has a shape extending in the predetermined direction. By the extending shape of the opposing terminal, even when a plurality of the opposing terminals have to be juxtaposed, the adjusting range of the conductive contact position in the predetermined direction can be increased. In particular, in the case where the connector is mounted on the electro-optical device, even when the mounting position is changed, the

DETAILED DESCRIPTION

Next, embodiments of an electro-optic device, an electro-optic module, and an electronic instrument according to the present invention will be described in detail with reference to the attached drawings.

First Embodiment

Figure 1:
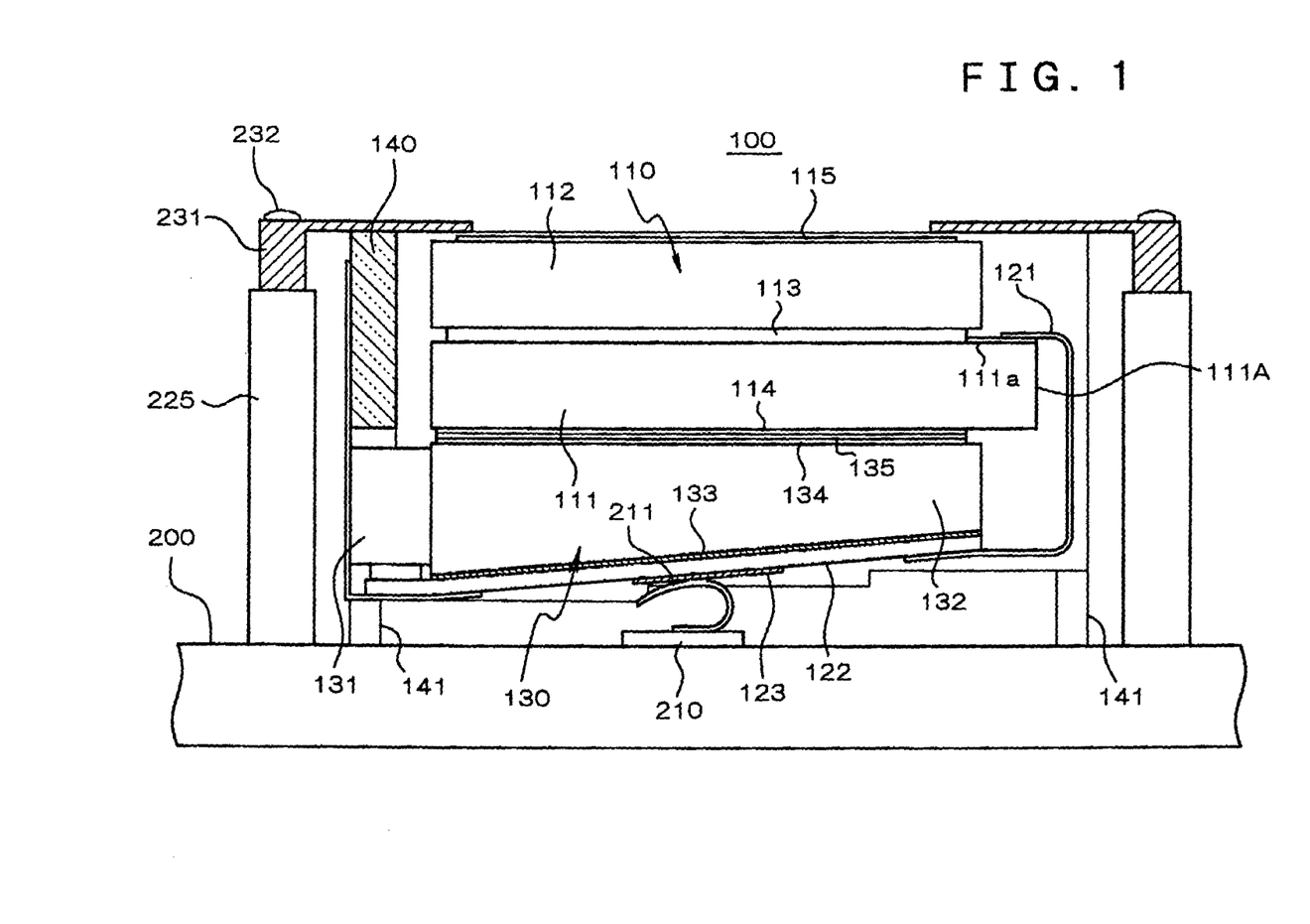
FIG. 1 is a schematic longitudinal sectional view of a mounting structure of an electro-optical device according to a first embodiment of the present invention.
Figure 2:
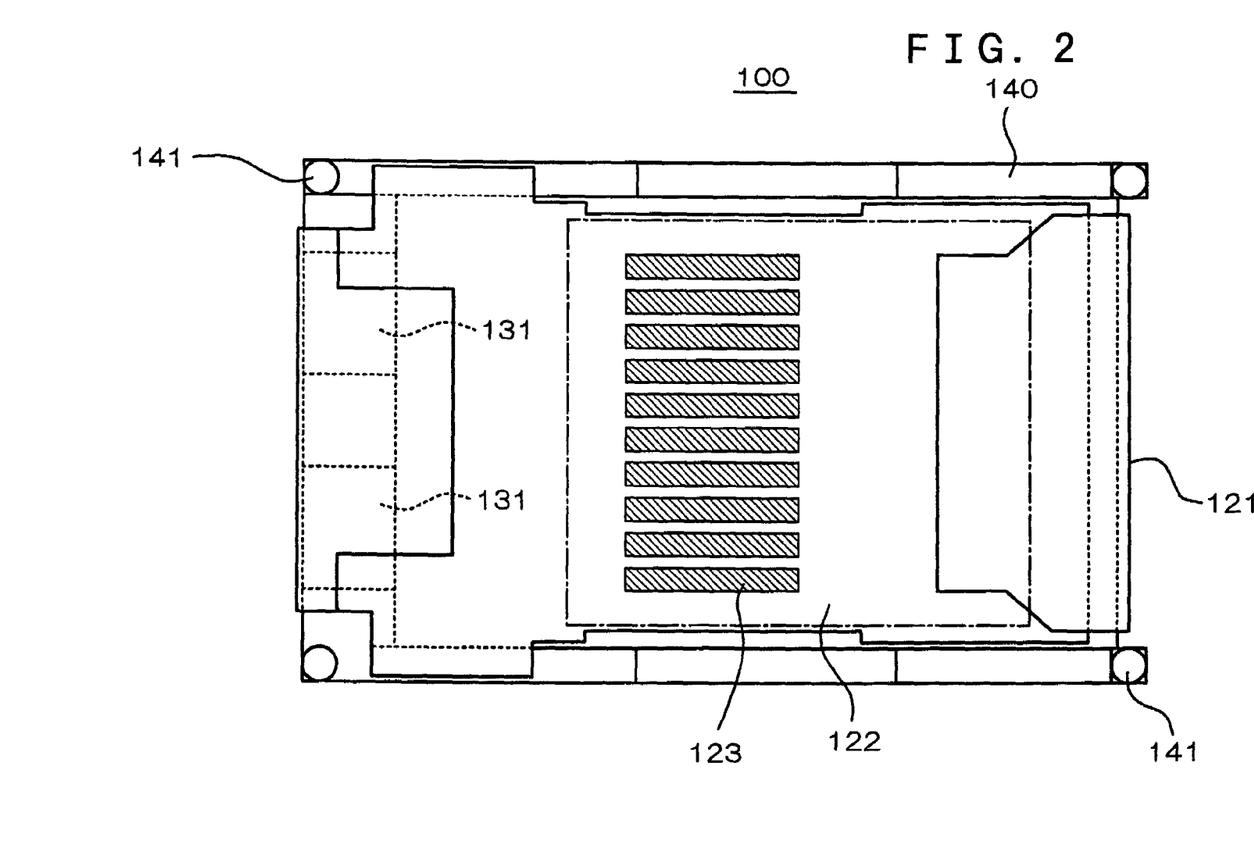
FIG. 2 is a bottom plan view of the electro-optical device according to the first embodiment.
Figure 3:
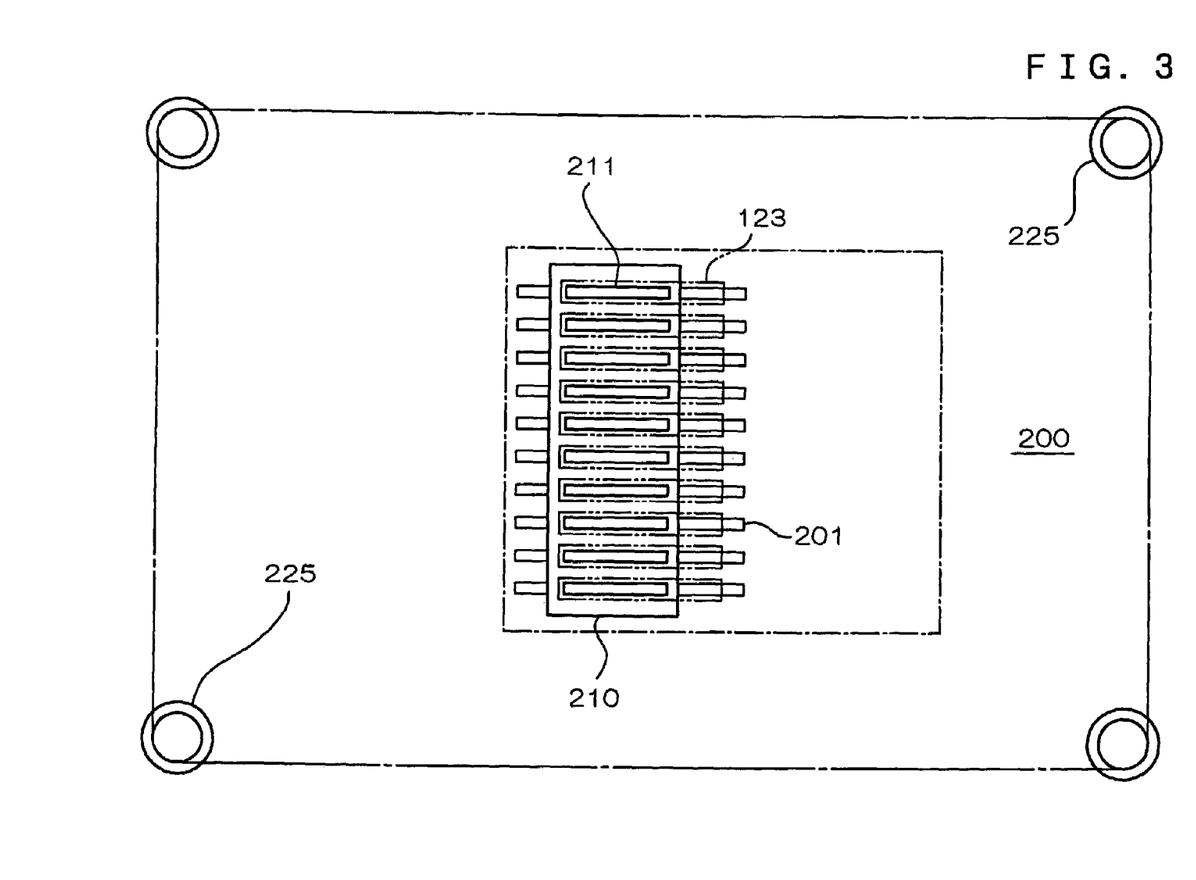
FIG. 3 is a plan view showing a surface structure of a mounting range of a circuit board of the electro-optical device according to the first embodiment.

First, referring to FIGS. 1 to 3, a first embodiment of an electro-optic device according to the present invention will be described. An electro-optical device 100 according to the embodiment is a liquid crystal module having a liquid crystal panel. FIG. 1 is a sectional view of a state of the electro-optical device 100 mounted on a circuit board (main substrate) 200, which is "the object" mentioned above; FIG. 2 is a bottom plan view of the electro-optical device 100; and FIG. 3 is a plan view of a mounting range of the circuit board 200.

The electro-optical device 100 includes a liquid crystal panel 110. The liquid crystal panel 110 is composed of transparent substrates 111 and 112, such as glass, bonded together with a sealing material 113 therebetween. In an internal region (liquid crystal inclusion region) of the sealing material 113 sandwiched by both the substrates, liquid crystal (not shown) is included. On the external surfaces of the transparent substrates 111 and 112, polarizers 114 and 115, a retardation film, or the like may be appropriately disposed if desired. In the transparent substrate 111, a substrate-overhanging part 111A overhanging outside the contour of the transparent substrate 112 disposed so as to oppose the transparent substrate 111. On the substrate-overhanging part 111A, a plurality of input terminals 111a, made of a transparent electric conductor, are formed. These input terminals 111a are conductively connected to electrodes (transparent electrodes), respectively, which are produced on the internal surfaces of the transparent substrates 111 and 112 in the liquid crystal inclusion region inside the sealing material 113.

On the substrate-overhanging part 111A, a flexible circuit board 121 is mounted. More specifically, the flexible circuit board 121 is bonded on the input terminals 111a with an anisotropic conductive film (ACF) therebetween. The flexible circuit board 121 is provided with a plurality of wirings (not shown) conductively connected to the plurality of input terminals 111a, respectively. The flexible circuit board 121 is conductively connected to a wiring circuit board 122 disposed on the backside of the electro-optical device 100. The wiring circuit board 122 is provided with a plurality of wirings conductively connected to the plurality of wirings on the flexible circuit board 121. On the wiring circuit board 122, electronic components (not shown, such as chips, capacitors of an integrated circuit) are mounted so as to form a liquid-crystal driving circuit. On the wiring circuit board 122, a plurality of substrate terminals 123, which are "the contact terminals", are arranged in an exposed state. These substrate terminals 123, as shown in FIG. 2, have shapes elongated in a predetermined direction (in the right direction in the drawing).

As shown in FIG. 1, in the rear of the liquid crystal panel 110, a backlight 130 is arranged. The backlight 130 includes a light source 131 composed of a light emitting diode and a light-guide plate 132 made of a transparent material such as an acrylic resin. The light source 131 is arranged at one edge (on the left in the drawing) of the light-guide plate 132 so as to be opposed thereto. It is preferable that the light source 131 abut an end face of the light-guide plate 132, as in the example shown in the drawing. The light-guide plate 132 has a sectional shape (wedge shape) with a thickness gradually decreasing from the left edge (in the drawing) toward the right edge. By arranging the light source 131 at the edge with the larger thickness, the light-guide plate 132 with such a shape is constructed so as to be able to efficiently emit the light, which is emitted from the light source 131 and introduced inside the light-guide plate 132, in the front surface, i.e., adjacent to the liquid crystal panel 110.

Also, by having the sectional shape mentioned above, the rear surface of the light-guide plate 132 is inclined in a predetermined direction, i.e., in the right direction in the drawing, relative to a panel surface (a surface parallel to surfaces of the transparent substrates 111 and 112 or a surface extending in parallel with a liquid crystal layer, i.e., a horizontal line in FIGS. 1 and 2) of the liquid crystal panel 110, or an arrangement position (generally, a position arranged on a surface of a circuit board 200, which is a surface parallel to the panel surface) of a holding case 140, which will be described later.

On the back surface of the light-guide plate 132, a reflection plate 133 is arranged. The reflection plate 133 is for reflecting the light emitted from the back surface of the light-guide plate 132 so as to return it inside the light-guide plate 132 again and to further emit it toward the liquid crystal panel 110. As the reflection plate 133, there are ones having a mirror-finished surface with a regular reflection function such as an aluminum layer and ones having a scatter reflection function such as white polyethylene terephthalate.

Between the light-guide plate 132 and the liquid crystal panel 110, a diffusing plate 134, a condensing plate 135, and the like are arranged. Wherein the diffusing plate 134 is for diffusing the light emitted from the light-guide plate 132 so as to reduce the illumination unevenness on the liquid crystal panel 110. The condensing plate 135 is for increasing the directivity of the light emitted from the light-guide plate 132 so as to increase the effective display brightness produced by the liquid crystal panel 110.

The electro-optical device 100 includes the holding case 140 for holding the liquid crystal panel 110 and the backlight 130. The holding case 140 is made by injection molding a synthetic resin. The holding case 140 is constructed like a rectangular frame so as to position the liquid crystal panel 110 and the backlight 130 from the periphery. On the backside of the holding case 140, a position holding projection 141 is provided as position holding means for determining the arrangement position of the holding case 140 by abutting the surface of the circuit board 200 disposed inside the instrument. In the example shown in the drawing, the position holding projections 141 are arranged at four corners of the holding case 140, respectively.

The wiring circuit board 122 is in a state supported on the back surface of the light-guide plate 132 with the reflection plate 133 therebetween. Therefore, the wiring circuit board 122 is also inclined in the predetermined direction relative to the panel surface of the liquid crystal panel 110 or to the arrangement position of the holding case 140, and as a result, the substrate terminals 123 are also inclined in the predetermined direction.

On a region for mounting the electro-optical device 100 on the circuit board 200, a connector 210 is mounted. The connector 210 is composed of a connector base made of an insulator such as a synthetic resin, and a plurality of connector terminals 211, which are opposing terminals elastically deflectable relative to the connector base. As such a connector, there is a compression-type connector shown in the example in the drawing. The connector terminals 211 are elastically deflectable at least in a contact direction of the substrate terminals 123 (the vertical direction in FIG. 1). These connector terminals 211, as shown in FIG. 3, are conductively connected to a plurality of mounting terminals 201, which are exposed on the surface of the circuit board 200, respectively. These respective mounting terminals 201 have a structure exposed by eliminating part of an insulating film (a permanent resist) covering the surface of the circuit board 200, for example. These respective mounting terminals 201 have a shape extending in the predetermined direction (the right in the drawing) on the surface of the circuit board 200.

In addition, in the example shown in the drawing, the respective mounting terminals 201 have the shape extending in the predetermined direction; however, as long as a conductor constituting the mounting terminal 201 has a shape extending in the predetermined direction, the mounting terminal 201 is not necessarily exposed to have the extending shape as described above. Even in this case, since the position of the mounting terminal 201 can be easily changed by only changing an opening position during the patterning of the insulating film (the permanent resist), the mounting position of the connector 210 can be easily changed in the predetermined direction, as will be described later.

On the circuit board 200, a plurality of bosses 225 are disposed in the periphery of a region for mounting the electro-optical device 100. These respective bosses 225 are constructed by fixing a column made of an insulator, such as a synthetic resin, on the circuit board 200. In the example of the drawing, as shown in FIG. 3, the bosses 225 are arranged at four positions in the periphery of the region. These bosses 225 are fixed by a fixing frame-member 231 with fixing screws 232 from above. At this time, since the fixing frame-member 231 pushes upper edges of the holding case 140 of the electro-optical device 100 arranged on the region, the electro-optical device 100 is fixed on the circuit board 200.

The electro-optical device 100 according to the embodiment takes the arrangement position shown in FIG. 1 in a state that the position holding projections 141 abut the surface of the circuit board 200, and by attaching the fixing frame-member 231 to the bosses 225 at this position, the electro-optical device 100 is fixed on the circuit board 200, as mentioned above. At this time, the substrate terminals 123 adjacent to the electro-optical device 100 are brought into conductive contact with the connector terminals 211 adjacent to the circuit board 200 under a predetermined contact pressure applied to one another. In this case, the contact pressure between the substrate terminal 123 and the connector terminal 211 is determined by the space between the substrate terminal 123 and the surface of the circuit board 200 at the contact position and elastic characteristics of the connector terminal 211.

Incidentally, according to the embodiment described above, since the substrate terminals 123 are inclined relative to the surface of the circuit board 200, by changing the contact position between the substrate terminals 123 and the connector terminals 211, the space between the substrate terminals 123 and the surface of the circuit board 200 can be changed so as to adjust the contact pressure. For example, by adjusting the mounting position of the connector 210 on the circuit board 200 in the predetermined direction, the conductive contact state between the electro-optical device 100 and the connector 210 can be adjusted so as to have an appropriate contact pressure. Thereby, the necessity for correcting metal molds for components such as the holding case 140 and the fixing frame-member 231 so as to obtain an appropriate conductive contact state is eliminated, enabling the design and development cycle of the electro-optical device 100 to be reduced and also initial costs produced along with the design and development to be reduced. Also, since the contact pressure can be easily adjusted, a more preferable contact pressure can be securely obtained, thereby stabilizing the conductive contact state, reducing the contact resistance, and also preventing display unevenness due to the excessive contact pressure.

According to the embodiment, the respective substrate terminals 123 have an extending shape in the predetermined direction (the right in the drawing) so as to be able to contact the connector terminals 211 over a wide range in the predetermined direction, increasing the range of an adjustment margin. For example, according to the embodiment, it is sufficient to adjust the space between the substrate terminals 123 and the connector 210 within a range of ±0.15 mm. Therefore, it is preferable that the length of the substrate terminal 123, which is "the contact terminal", in the predetermined direction be the same as or larger than the length calculated from the above-mentioned space and the inclined angle of the wiring circuit board 122 (about 0.6 to 0.8 mm, for example).

Since the mounting terminal 201 also has a shape extending in the predetermined direction, the position of the connector 210 on the circuit board 200 can be adjusted in the predetermined direction over a wider range as described above. It is preferable that the length of the mounting terminal 201 in the predetermined direction also be substantially the same as that of the substrate terminal 123 mentioned above.

According to the embodiment, the wiring circuit board 122 having the substrate terminals 123 is arranged at a position inclined in the predetermined direction and in a supported state by the backside of the wedge-shaped light-guide plate 132, so that a particular structure supporting the wiring circuit board 122 is not required, simplifying the structure of the holding case 140. Therefore, eliminating an additional supporting structure increasing the thickness of the electro-optical device 100 enables increase in the thickness of the electro-optical device 100 to be restricted and the thickness of the device to be reduced.

However, it may be desirable to provide a separate supporting structure for supporting the wiring circuit board 122 to the holding case 140 in an inclined position in cases where the thickness of the electro-optical device 100 counts for nothing, the light-guide plate 132 does not have a wedge-shaped section, and a reflection-type liquid crystal device does not have the backlight 130.

Second Embodiment

Figure 4:
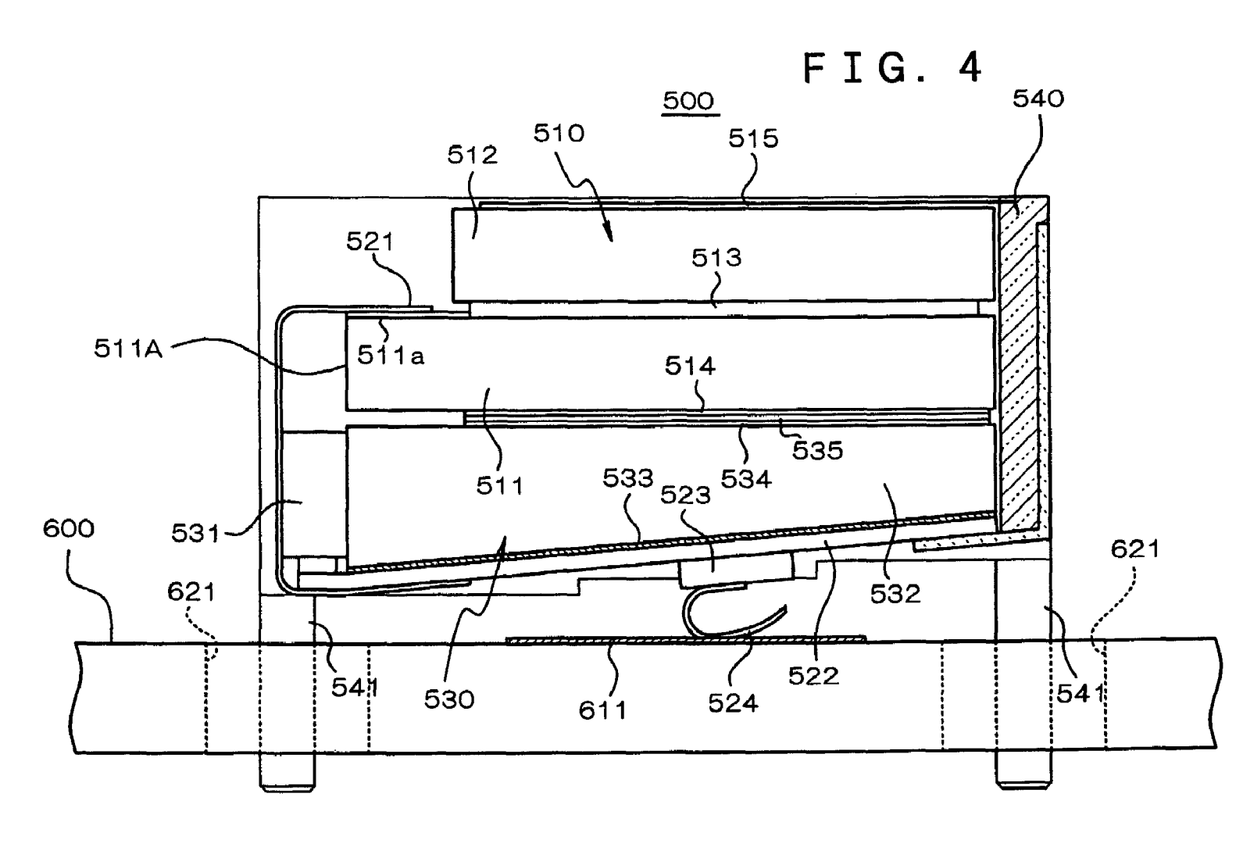
FIG. 4 is a schematic longitudinal sectional view of a mounting structure of an electro-optical device according to a second embodiment of the present invention.
Figure 5:
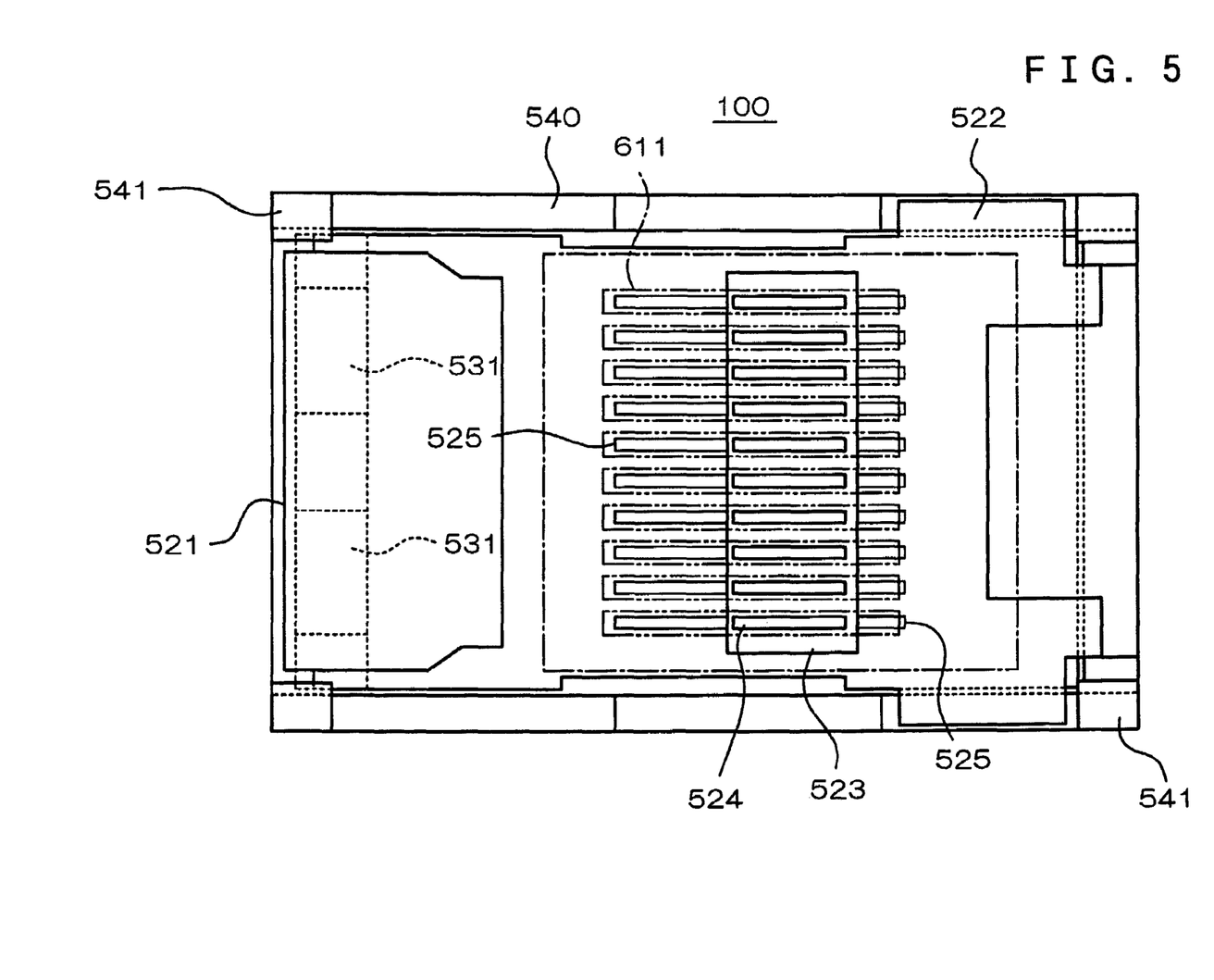
FIG. 5 is a bottom plan view of the electro-optical device according to the second embodiment.
Figure 6:
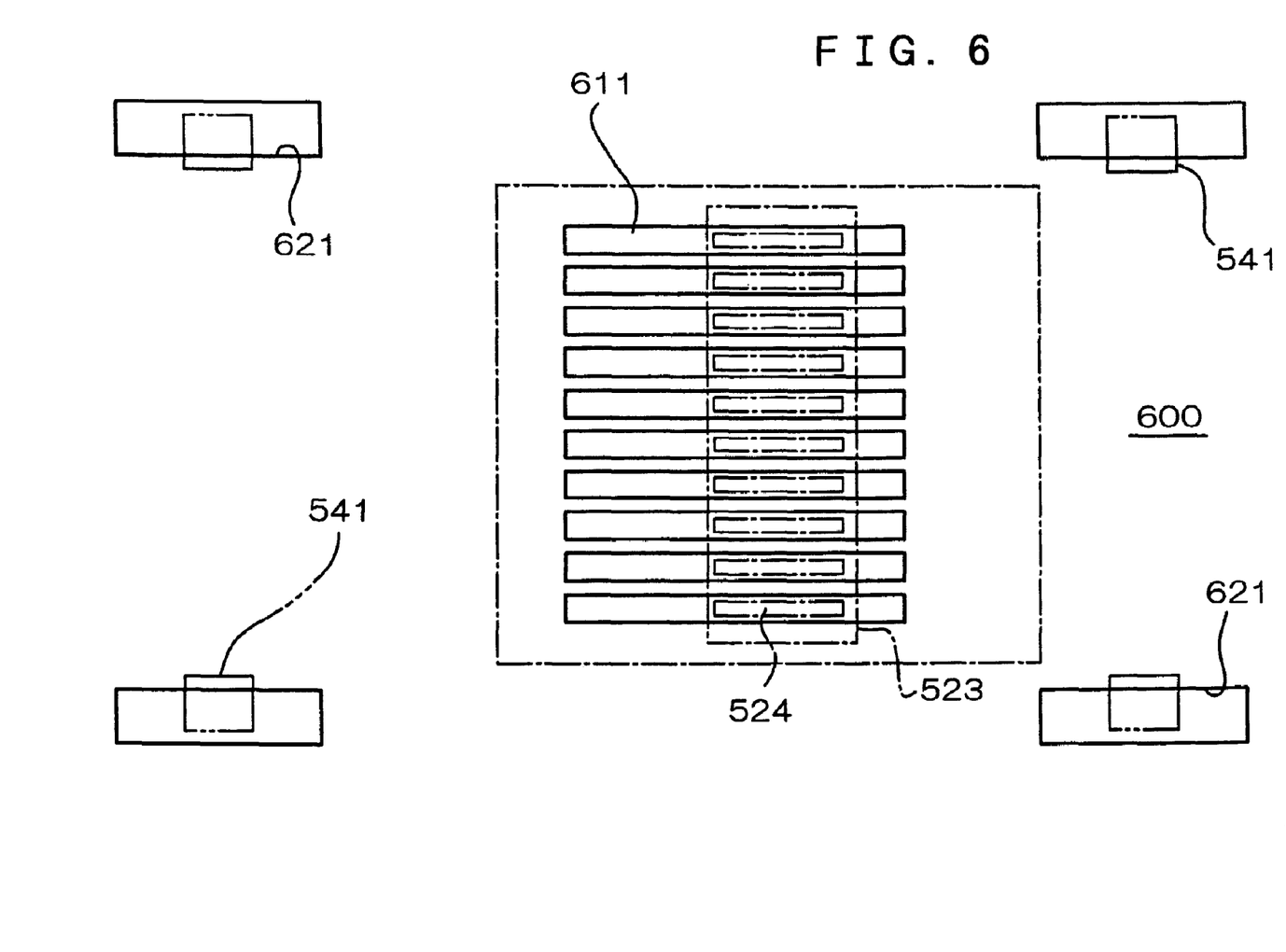
FIG. 6 is a plan view showing a surface structure of a mounting range of a circuit board of the electro-optical device according to the second embodiment.

Next, a second embodiment of an electro-optical device according to the present invention will be described with reference to FIGS. 4 to 6. FIG. 4 is a longitudinal sectional view of the state that an electro-optical device 500 is mounted on a circuit board (main substrate) 600 equivalent to "the object"; FIG. 5 is a bottom plan view of the electro-optical device 500; and FIG. 6 is a plan view of a mounting region of the circuit board 600. The electro-optical device 500 according to the second embodiment includes a liquid crystal panel 510 structured substantially similarly to the first embodiment (including transparent substrates 511 and 512, a sealing material 513, polarizers 514 and 515, and an input terminal 511a on a substrate-overhanging part 511A), a flexible circuit board 521, a wiring circuit board 522, and a backlight 530 (having a light source 531, a light-guide plate 532, a reflection plate 533, a diffusing plate 534, and a condensing plate 535).

However, a connector 523 is mounted on the wiring circuit board 522 according to the embodiment, and the connector 523 is provided with a plurality of connector terminals 524 which are contact terminals. These connector terminals 524 are elastically deflectable in a contact direction (the vertical direction in FIG. 5). Each connector terminal 524 of the connector 523 is conductively connected to a mounting terminal 525 exposed on the surface of the wiring circuit board 522. The mounting terminal 525 has a shape extending in the predetermined direction (the right in the drawing).

A holding case 540 according to the embodiment is provided with a hook-like position holding projection 541 for determining the arrangement position of the holding case 540 and also fixing the holding case 540 to the circuit board 600. According to the embodiment, the position holding projections 541 are arranged at four corners of the holding case 540, respectively, as shown in FIG. 5.

On the circuit board 600, a plurality of substrate terminals 611, which are "the opposing terminals" conductively contacting the connector terminals 524, are produced. The respective substrate terminals 611 have a shape extending in the predetermined direction (the right in the drawing). Also, on the circuit board 600, as shown in FIG. 6, through-openings 621 are formed at the periphery of a mounting range of the electro-optical device 500. The position holding projection 541 is inserted into the through-opening 621 so that the holding case 540 is brought into engagement with the circuit board 600 due to the hook shape of the position holding projection 541, enabling the electro-optical device 500 to be fixed on the circuit board 600.

Also, according to the embodiment, in the same way as in the first embodiment, the wiring circuit board 522 is inclined in the predetermined direction relative to a panel surface of the liquid crystal panel 510 or to the arrangement position of the holding case 540. The connector 523 in a state of being supported by the inclined wiring circuit board 522 is mounted on the wiring circuit board 522 also arranged in an inclined position.

At this time, by changing the mounting position of the connector 523, the contact pressure between the connector terminals 524 and the substrate terminals 611 can be adjusted by the same reason as in the first embodiment. Since the wiring circuit board 522 is brought into conductive contact with the mounting terminals 525, and the mounting terminal 525 has a shape extending in the predetermined direction, the mounting position of the wiring circuit board 522 can be easily changed in the predetermined direction, and thereby the contact pressure can be adjusted. At this time, in the same way as in the first embodiment, since the position of the mounting terminal 525 in the predetermined direction can be changed only by changing the opening pattern, the exposed shape of the mounting terminal 525 may not be the extending shape as mentioned above.

Since the substrate terminal 611, which is "the opposing terminal", also has a shape extending in the predetermined direction, by changing the position of the connector 523, the conductive contact between the connector terminals 524 and the substrate terminals 611 can also be achieved over a wide range in the predetermined direction. Therefore, the same advantages as in the first embodiment can be obtained.

Electronic Instrument

Figure 7:
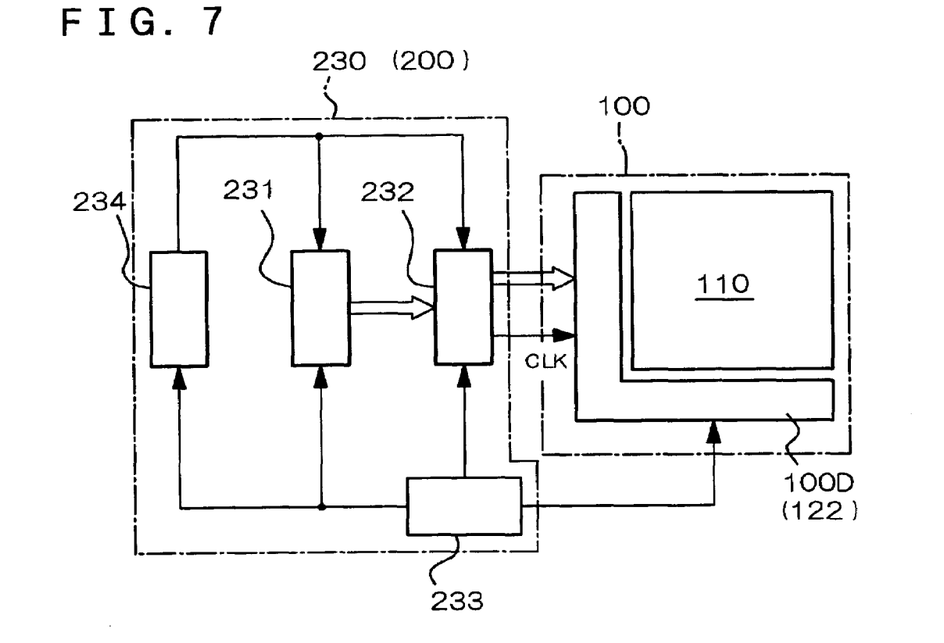
FIG. 7 is a schematic block diagram of a control system of an embodiment of an electronic instrument according to the present invention.

Finally, referring to FIGS. 7 and 8, an embodiment of an electronic instrument according to the present invention will be described. In this embodiment, a case where the electro-optical device 100 including the liquid crystal panel is used as a display of the electronic instrument will be described. FIG. 7 is a schematic block diagram of an entire control system (a display control system) for the electro-optical device 100 in the electronic instrument according to the embodiment. The electronic instrument shown in the drawing includes a display-information output source 231, a display-information processing circuit 232, a power supply circuit 233, and a display-control circuit 230 (arranged in the circuit board 200) including a timing generator 234.

Also, the above-mentioned electro-optical device 100 includes the liquid crystal panel 110 and a driving circuit 100D (a liquid crystal driving circuit arranged in the wiring circuit board 122) for driving the liquid crystal panel 110.

The display-information output source 231 includes a memory having an ROM (read only memory), an RAM (random access memory), and the like; a storage unit having a magnetic recording disk and an optical recording disk; and a tuning circuit for tuning and producing a digital image signal; and it is configured so as to supply display information to the display-information processing circuit 232 as an image signal in a predetermined format, based on various clock signals produced by the timing generator 234.

The display-information processing circuit 232 includes various known circuits such as a serial/parallel conversion circuit; an amplifier/inverter circuit; a rotation circuit, a gamma control circuit; and a clamp circuit; and it executes the input display-information processing and supplies the processed image information to the driving circuit 100D along with a clock signal CLK. The driving circuit 100D includes a scanning-line driving circuit, a signal-line driving circuit, and an inspection circuit. The power supply circuit 233 supplies a predetermined voltage to the respective components mentioned above.

Figure 8:
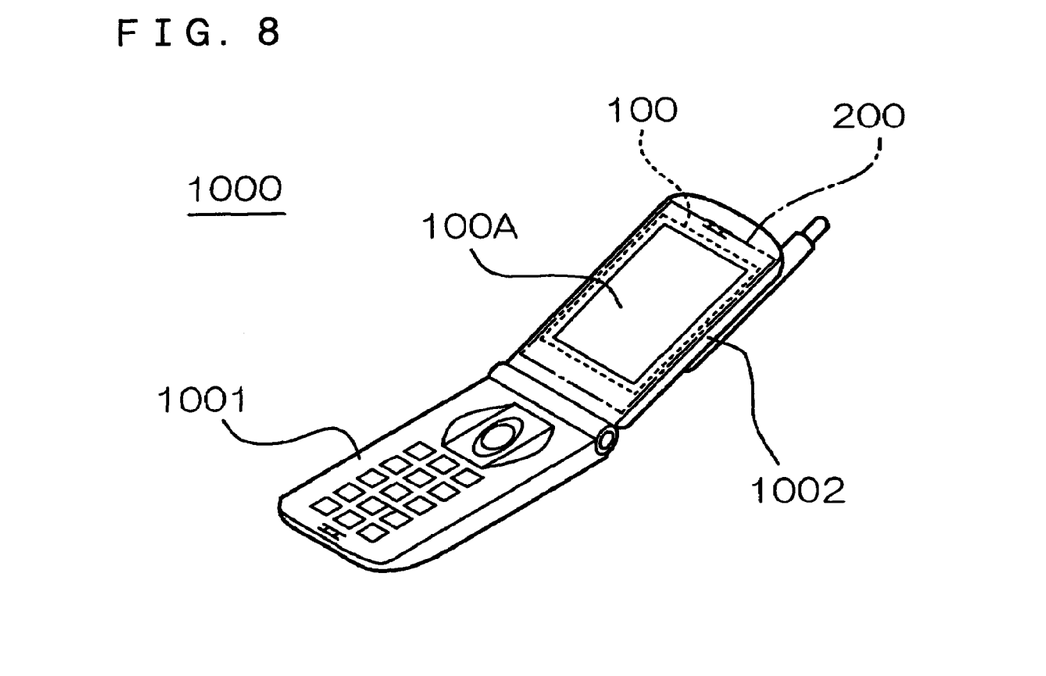
FIG. 8 is a schematic perspective view of a mobile phone as an example of the embodiment of the electronic instrument according to the present invention.

FIG. 8 shows a mobile phone as an embodiment of the electronic instrument according to the present invention. A mobile phone 1000 includes an operational unit 1001 and a display 1002. On the front face of the operational unit 1001, a plurality of operational buttons are arranged, and a microphone is built within a transmitting unit. Also, within a receiving unit of the display 1002, a speaker is arranged.

In the display 1002, the circuit board 200 is arranged inside a case, and the liquid crystal panel 100 is mounted on the circuit board 200. In the liquid crystal panel 100 arranged inside the case, the display surface is visible through a display window 100A.

According to the embodiment, a structure is exemplified in that the electro-optical device 100 and the circuit board 200 according to the first embodiment are arranged inside the electronic instrument; alternatively, the electro-optical device 500 and the circuit board 600 according to the second embodiment may be arranged therein.

An electro-optical device and an electronic instrument according to the present invention are not limited to the above-mentioned examples shown in the drawings and various modifications may be of course made within the scope of the present invention. For example, any electro-optical device according to the embodiments described above is a liquid crystal display device having a liquid crystal panel; alternatively, instead of the liquid crystal panel, the liquid crystal display device may have various electro-optical panels such as an inorganic electroluminescence device, an organic electroluminescence device, a plasma display device, and an FED (field emission display) device. Also, to the liquid crystal panel 100, the flexible circuit board and a TAB (tape automated bonding) substrate are connected; however, the liquid crystal panel may have a so-called COG (chip-on-glass) type structure in which an IC chip is directly mounted on at least one substrate. Furthermore, the liquid crystal device is not limited to the passive matrix type according to the embodiments described above; alternatively, it may be an active matrix type. Also, according to the embodiments, instead of the light-guide plate having a wedge-shaped section, a parallel flat-plate type light-guide plate may also be used as a backlight. Also, the electro-optical device may not have the light-guide plate (or backlight) itself.

ADVANTAGES

As described above, according to the present invention, in the electro-optical device mounted on an object, the contact pressure at a conductive contact point can be adjusted without correcting shapes of components, enabling a design and development cycle to be reduced and initial costs to be reduced.

The entire disclosure of Japanese Patent Application No. 2002-275194 filed Sep. 20, 2002 is incorporated by reference.

What is claimed is:

1. An electronic instrument comprising:
    an electro-optical panel having an electro-optical material;
    a light-guide plate having a first surface and a second surface on opposite sides thereof, the first surface facing the electro-optical panel and extending substantially in parallel with the electro-optical panel in a horizontal direction, a thickness of the light-guide plate gradually decreasing in the horizontal direction so that the second surface is inclined with respect to the electro-optical panel;
    a wiring circuit board disposed at the inclined second surface of the light-guide plate;
    a conductive terminal disposed on the wiring circuit board;
    a circuit board; and
    a connector mounted on the circuit board at a position between the wiring circuit board and the circuit board and having an elastically deformable compression-type connector terminal in conductive contact with the terminal on the wiring circuit board at a conductive contact position, the connector being shiftable in the horizontal direction on the circuit board and the conductive contact position between the connector terminal of the connector and the conductive terminal of the wiring circuit board being shifted in accordance with shifting of the connector.

2. An instrument according to claim 1, further comprising a fixing structure for fixing the holding member on a mounting surface of the circuit board at the arrangement position.

3. An instrument according to claim 1, further comprising controlling means for controlling the electro-optical device.

4. An instrument according to claim 1, wherein the circuit board is provided with a mounting terminal, which is brought into conductive contact with the connector, and has a shape extending in the predetermined direction.

5. An instrument according to claim 1, wherein the terminal has a shape extending in the predetermined direction.

6. An instrument according to claim 1, further comprising a light source for introducing light inside the light-guide plate from an edge of the light-guide plate,
    wherein the light source is arranged to oppose an edge of the light-guide plate disposed in a direction opposite to the predetermined direction.

7. An electronic instrument comprising:
    an electro-optical panel having an electro-optical material;
    a light-guide plate having a first surface and a second surface on opposite sides thereof, the first surface facing the electro-optical panel and extending substantially in parallel with the electro-optical panel in a horizontal direction, a thickness of the light-guide plate gradually decreasing in the horizontal direction so that the second surface is inclined with respect to the electro-optical panel;
    a circuit board;
    a conductive terminal disposed on the circuit board;
    a wiring circuit board disposed at the inclined second surface of the light-guide plate; and
    a connector mounted on the wiring circuit board at a position between the wiring circuit board and the circuit board and having an elastically deformable compression-type connector terminal in conductive contact with the conductive terminal on the circuit board at a conductive contact position, the connector being shiftable in the horizontal direction on the wiring circuit board and the conductive contact position between the connector terminal of the connector and the conductive terminal of the circuit board being shifted in accordance with shifting of the connector.

* * * * *